Nov. 7, 1950     B. L. TAYLOR     2,528,673
STEREOSCOPIC VIEWING DEVICE

Filed Sept. 24, 1946     2 Sheets-Sheet 1

Inventor
BARNEY L TAYLOR

Attorneys

Nov. 7, 1950 — B. L. TAYLOR — 2,528,673
STEREOSCOPIC VIEWING DEVICE
Filed Sept. 24, 1946 — 2 Sheets-Sheet 2
FIG. 3.
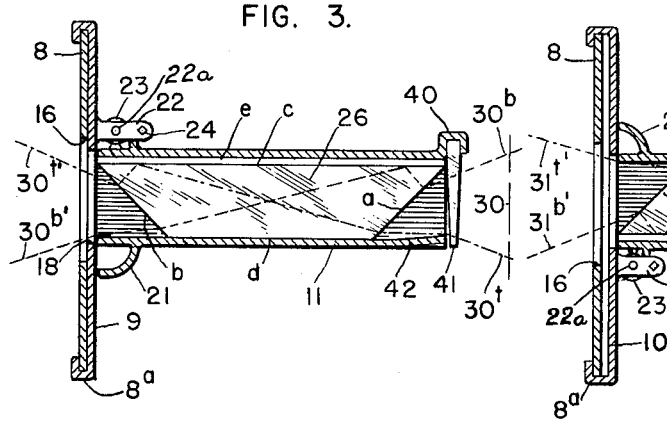
FIG. 4.
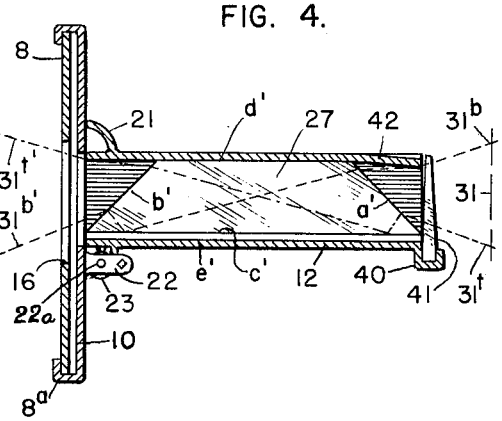
FIG. 6.
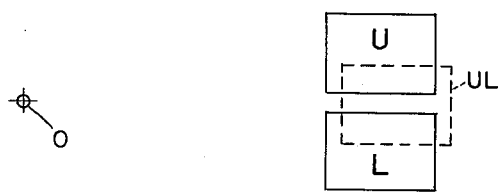
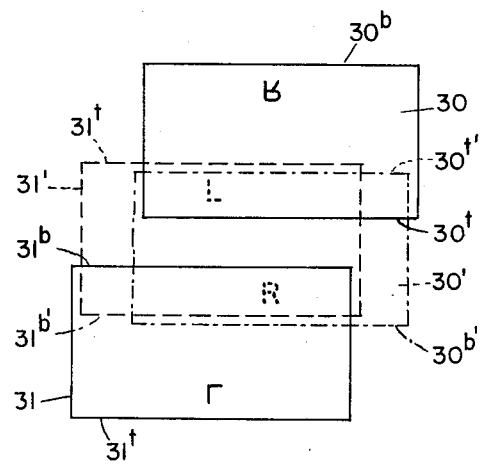
FIG. 5.
FIG. 7.
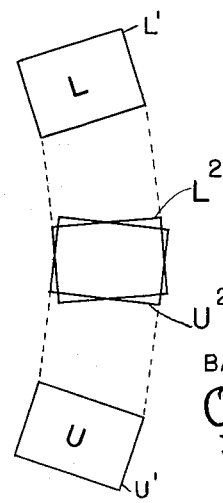
Inventor
BARNEY L. TAYLOR
Cushman,
Darby & Cushman
Attorneys Patented Nov. 7, 1950

2,528,673

UNITED STATES PATENT OFFICE 2,528,673

STEREOSCOPIC VIEWING DEVICE

Barney L. Taylor, Garrett Park, Md.

Application September 24, 1946, Serial No. 698,899

4 Claims. (Cl. 88—29)

This invention relates to a stereoscopic device and, more particularly, is directed to such a device provided with a pair of reflecting prisms adapted to view a pair of stereoscopic pictures. The invention includes certain features which are an improvement on the invention of Patent No. 2,289,467, issued to me on July 14, 1942 for Stereoscope.

An object of the invention is to provide a stereoscopic device which will enable two stereograms to be brought into optical coincidence to create a stereograph regardless of the distance of the device from, or its angle with respect to, the stereograms and without changing the respective vertical or horizontal alignments of the stereograms.

Other objects and advantages of the invention will be apparent from the following specification and accompanying drawings. In the drawings, Figure 1 is a front view of the device of the invention.

Figure 3 is a vertical section on the line 3—3 of Figure 1, the view being on an enlarged scale and including a showing of the action of the prism illustrated therein.

Figure 4 is a vertical section on the line 4—4 of Figure 1, the view being on an enlarged scale and including a showing of the action of the prism illustrated therein.

Figure 5 is a diagrammatic view showing the action of the device with a pair of stereograms positioned directly in front of the observer, and Figures 6 and 7 diagrammatically illustrate the action of the device with a pair of stereograms when the latter are viewed from an angle.

Referring to Figures 1 to 4, the device preferably has the general form of a pair of spectacles and includes a front piece or base element designated by the numeral 8 and which serves as a support or guideway for laterally adjustable slides 9 and 10, respectively. The slides 9 and 10 in turn, have prism holders 11 and 12 respectively pivoted upon their front faces.

Figure 1:
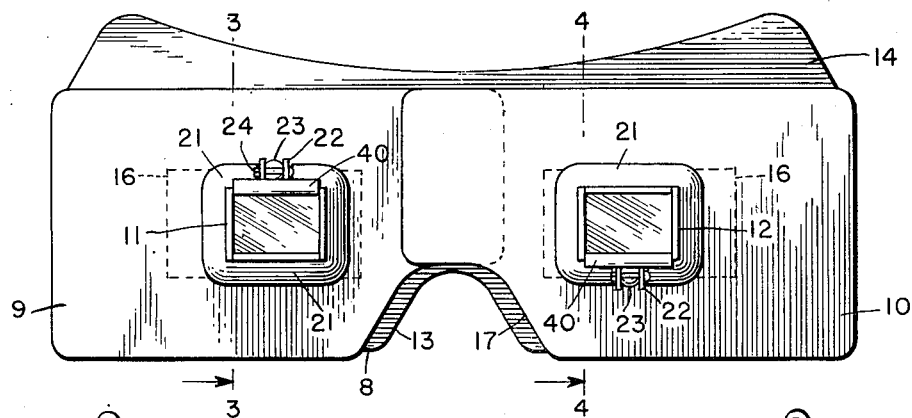

As is best shown in Figure 1, the base element 8 is in the form of a flat plate with a notch 13 provided centrally of its lower edge to engage the bridge of a user's nose. Element 8 is provided with a side and top hood portion 14 and pivoted ear pieces 15. Base element 8 also includes a pair of relatively large apertures 16 which are of sufficient size that the viewing elements or prisms of the prism holders 11 and 12 will be visually accessible in any adjusted position of the slides 9 and 10.

Figure 2:
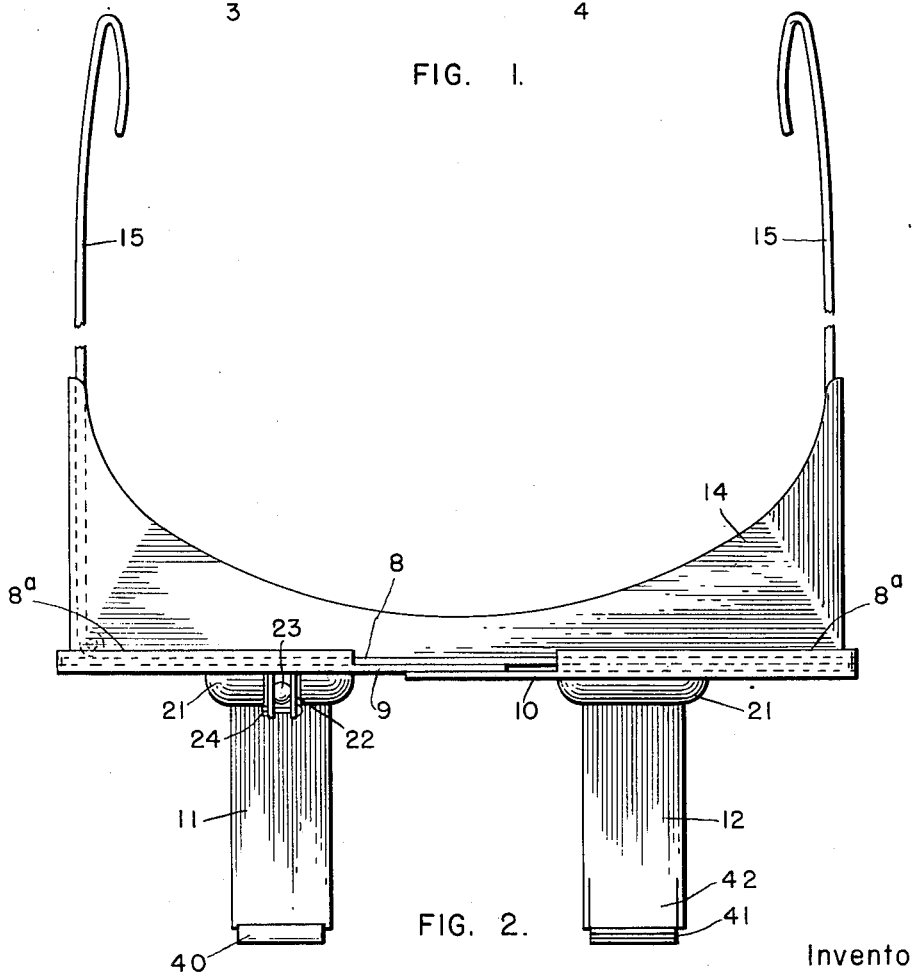
Figure 2 is a top view of the device.

Each of the slides 9 and 10 is of plate-like form but of substantially less lateral width than the base element 8. Also, as shown in Figures 2 and 3, the slides have their upper and lower edges curled as shown at 8a so that they will be laterally slidable upon the upper and lower edges of base element 8. The inner and lower corner of each slide may be notched, as indicated at 17 in Figure 1, to permit the slides to be moved inwardly on the base element without overlapping the nose-engaging notch 13 of the base element 8.

Each of the slides 9 and 10 is provided with a substantially rectangular aperture 18 and the prism holders 11 and 12 are mounted in front of these apertures. Each prism holder 11 and 12 is in the form of a tube which is rectangular in vertical section and projects forwardly from the corresponding slide 9 or 10. At the inner end of each prism holder a flange or skirt 21 extends outwardly from the holder, the skirt having sufficient area that it will completely cover the apertures 18 and 16 in any adjusted position of the slides or prisms. The skirts 21 are preferably curved toward the slides and are formed of a flexible material. This will permit the holders to be swung with respect to the slides as hereinafter described, but at the same time prevent light from reaching the user's eyes at the joint between the holders and the slides. This is desirable because the inner ends of the holders must be slightly spaced from the front surfaces of the slides to permit adjusting movement of the holders.

In order to adjustably secure the prism holders to the respective slides, two perforated ears or tabs 22 extend forwardly from each slide and a ball-headed stud 23 secured to the corresponding prism holder is frictionally clamped between the ears by means of a small rivet or bolt 24. The ball of the stud preferably seats in the perforations 22a of the ears 22. This connection provides a universal joint between each slide and prism holder. As is best shown in Figures 1 to 4, the universal joint for the right eye prism holder 11 is positioned at the top of the holder 11 while the joint for the left eye prism holder 12 is positioned at the bottom of that holder. The above positioning of the pivots is optional and could be reversed if desired.

It will be observed that each prism holder may be swung laterally, twisted or rotated clockwise or counter-clockwise, or swung upwardly or downwardly at any desired point in such arcs.

Figures 3 and 4 respectively illustrate the prism devices 26 and 27 carried by the respective prism holders 11 and 12. As is shown in these figures, each prism is a Dove reversion prism, i. e., an isosceles single reflecting prism with its entrant and emergent faces perpendicular to each other. In more detail, referring to Figure 3, the right eye prism 26 has its entrant face a and emergent face b inclined downwardly and toward each other and perpendicular to each other. The upper and lower faces c and d, respectively, of this prism are parallel and the lower face d is the shorter face. A reflecting surface e is provided on the upper and lower face c, either by means of a coating applied to this face or by the action of a separate mirror secured to the face.

The action of the right eye prism 26 is diagrammatically indicated in Figure 3. In more detail, the line 30 represents the right-hand stereogram which is being viewed through the prism. As is hereinafter more fully explained, the stereogram viewed through the prism will have been printed from a photograph negative in a reverse procedure to that used in ordinary photographic processing. That is, the stereogram will have been projected or printed inverted, but the true left and right aspects of the object will be maintained; viz., an object appearing at the left in the photographed scene will also appear at the left side of the inverted stereogram. The stereogram will be inverted by the Dove prism so that the image which the spectator observes will be transposed to give an accurate representation of the photographed object in its natural and upright aspect. This will be clear from Figure 5, wherein the stereogram 30 is shown in elevation and comprises a solid line rectangle bearing a solid line inverted letter "R." Obviously, the stereogram 30 is an inverted view of an original object comprising a square with an upright "R" superimposed thereon. From the above, it will be perceived that in Figure 3, 30b is the bottom of the original object, while 30t is the top of the original object. The dash lines appearing in Figure 3 indicate how the prism will reflect and transpose 30b so that the viewer's right eye will perceive this at the bottom 30b' of the received image. The dot and dash lines indicate the passage of light from 30t, the prism and mirror acting to cause these to be perceived at the top 30t' of the image perceived by the observer's right eye. Thus, the steeogram 30 will be inverted by the prism and mirror so that the image which the observer will see will be transposed to its upright form.

Figure 4 illustrates the action of the prism 27, which prism is vertically inverted with respect to prism 26 so that its long mirrored surface c' is lowermost. In Figure 4 the reference characters a' to e' designate the same relative parts on the prism 27 as the characters a to e designate in Figure 3 with respect to the prism 26. It will be observed that Figure 4 illustrates how prism 27 transposes inverted image 31 (also shown in Figure 5) to bring points 31b and 31t to 31b' and 31t', respectively, so that the user's left eye will perceive the sterogram in the same way it appeared in the original object.

Figure 5 diagrammatically illustrates the operation of the stereoscopic device of my invention when used with stereograms of the inverted type described above and which are positioned directly in front of the observer. In this instance, the images are arranged one beneath the other, with a slight lateral offset, for clarity of illustration.

It will be understood that the lateral spacing of the stereograms shown in Figure 5 is not necessary, when stereograms are farther away than approximately 18" from the observer. In this case they could be, and preferably would be, in vertical alignment.

The upper solid line rectangle of Figure 5 designated by the numeral 30 is an inverted stereogram of a scene as taken by a right-hand camera. The lower solid line square 31 is a left-hand stereogram of the same scene. However, for clarity, the images 30 and 31 have the letters R and L respectively inverted thereon.

In order to obtain a third-dimensional image, the user will swing the left-hand prism holder 12 downwardly so that inverted stereogram 31 will appear upright in the area 31' indicated by dash lines and with the "L" upright as also shown in dash lines. He may then swing the right-hand prism holder 11 upwardly so that the right-hand stereogram 30 will appear in the area 30' indicated by dot and dash lines with the "R" now appearing upright, as also indicated by dot and dash lines. It will thus be observed that the two upright stereograms 30' and 31' appear in horizontal registry. (The slight off-setting of the various lines with respect to each other in Figure 5 is simply for the purpose of clarity of illustration). By reason of the normal action of the viewer's eyes, the two right and left stereograms 30' and 31', respectively, will now merge at a point laterally intermediate the stereograms 30' and 31' to produce a stereoscopic view.

It will be observed that the stereoscopic view thus afforded is obtained with a minimum of adjustment.

A purpose of this device is to view stereographs in an ordinary size magazine. By having one stereogram printed above, or approximately above, the other to accommodate a clearer vision of the respective stereograms through the stereoscope and by the insertion of small magnifying lenses 41, as shown in Figures 3 and 4, a stereograph can be obtained. Use of the lenses 41 is optional, as satisfactory results can be obtained without the lenses. However, the lenses 41 will afford a virtual enlargement of the stereograph at normal magazine reading distance. Suitable lenses 41 can be manufactured by merely cutting an ordinary magnifying lens into halves and using the thicker area of each half toward the bases c and c' of the prisms. The opposite edges of the lenses 41 will be ground to be parallel. This matter of cutting the lenses will also give a slight refracting quality to the lenses 41 which lessens the necessary downward or upward adjusting movement of the Dove prisms. In other words, a lens 41 and the corresponding prism will have an additive refractive effect.

Figures 6 and 7 diagrammatically illustrate the action of the device in obtaining a stereograph when an upper stereogram U and a lower stereogram L are viewed from their left, for example, from the point O indicated in Figure 6 at any greater distance than approximately 18".

Actually, the stereograph obtained from the stereograms U and L of Figure 6 will be visible to the observer in the dotted line area indicated at UL in Figure 6. However, in order to make the operation of the device clear, Figure 7 greatly exaggerates the action of the device whereby the stereograph UL is obtained.

Referring to Figure 7, if the user of the device views the stereograms U and L of Figure 7 from the point O of Figure 7, and if the Dove prisms are both lying in a horizontal plane, the user will first perceive the stereogram L at the point L' of Figure 7. At the same time, the stereogram U would be perceived at the point U' at Figure 7. In order to bring the two stereograms together, the user will adjust the proper prism holder 11 or 12 to move stereogram image L' clockwise to the area L², and the other holder will be adjusted to move stereogram image U' counterclockwise to position U². Then by slightly twisting both prism holders, i. e., rotating them very slightly about their universal joints, the two stereograms will be brought into optical registry or coincidence. As has been stated above, Figure 7 greatly exaggerates the optical action and registry and coincidence of the two stereograms would occur at a position with respect to U and L in Figure 7 similar to that which the stereograph UL occupies in Figure 6.

The magnifying lenses 41 can be supported in horizontally extending grooves 40 such as shown at the outer ends of the prism holders in Figures 3 and 4. The thickest portion of each lens 41 will be positioned adjacent the long face of the corresponding prism. In order to enable the left-hand stereogram to be blocked off from the right eye of the observer, the lower outer portion of the holder 11 will be cut or slit to form a flap 42 which can be bent slightly upwardly into the path of any image of the left-hand stereogram which otherwise would be visible to the observer's right eye. Holder 12 will have a similar flap 42 at its upper portion.

It will be noted that the device is of such design that while it will be very sturdy, it will be only slightly heavier than ordinary spectacles. In addition, the device can be worn over a pair of ordinary spectacles or eyeglasses.

The terminology used in the specification is for the purpose of description and not of limitation, the scope of the invention being indicated in the following claims.

I claim:
1. In a stereoscopic viewing device, a support, a pair of prism holding elements projecting horizontally from the support, a universal joint connection between the lower portion of one of said elements and the support, a Dove reversion prism having a reflecting surface at its lower face carried in said element, a Dove reversion prism having a reflecting surface at its upper face carried in said other element, and a universal joint connection between the upper portion of said last-mentioned element and said support.

2. A stereoscopic viewing device of the character defined in claim 1 wherein each element includes a flap at its outer end, which flap is movable to block out a stereogram of opposed order.

3. In a stereoscopic viewing device, a base element, a pair of slides laterally movable with respect to said base element, a pair of Dove reversion prisms, said prisms being secured to the respective slides for movement in a vertical plane with respect to the slide, one of the prisms having its reflecting surface facing upwardly, the other prism having its reflecting surface facing downwardly, and said base element being provided with apertures of sufficient size laterally thereof to permit the corresponding prism to be viewed therethrough during any adjusted position of the prism.

4. A stereoscopic viewing device of the character defined in claim 3 wherein the reversion prism is movable with respect to the corresponding slide by means of a universal joint.

BARNEY L. TAYLOR.

REFERENCES CITED

The following references are of record in the file of this patent:

UNITED STATES PATENTS

| Number | Name | Date |
|---|---|---|
| 907,973 | Crocker et al. | Dec. 29, 1908 |
| 1,169,163 | Kellner | Jan. 25, 1916 |
| 1,313,262 | Compere | Aug. 19, 1919 |
| 1,494,728 | Beyerlen | May 20, 1924 |
| 1,632,851 | Reaves | June 21, 1927 |
| 1,798,396 | Bauersfeld et al. | Mar. 31, 1931 |
| 1,818,974 | Engelmann | Aug. 18, 1931 |
| 1,850,153 | Paroselli | Mar. 22, 1932 |
| 1,971,066 | Eppenstein | Aug. 21, 1934 |
| 2,143,632 | Ott | Jan. 10, 1939 |

FOREIGN PATENTS

| Number | Country | Date |
|---|---|---|
| 419,967 | France | Nov. 10, 1910 |
| 529,233 | France | Sept. 5, 1921 |
| 174,130 | Switzerland | Dec. 31, 1934 |

OTHER REFERENCES

Southall, James P. C., "Mirrors, Prisms, Lenses," 1923 Edition, page 583.